(12) United States Patent
Xu et al.

(10) Patent No.: US 12,212,578 B2
(45) Date of Patent: Jan. 28, 2025

(54) PARTIAL PAYLOAD ENCRYPTION WITH INTEGRITY PROTECTION

(71) Applicant: WhatsApp LLC, Menlo Park, CA (US)

(72) Inventors: Shipeng Xu, Union City, CA (US); Nikant Vohra, Fremont, CA (US); Konstantinos Chalkias, Menlo Park, CA (US)

(73) Assignee: WhatsApp LLC, Menlo Park, CA (US)

( * ) Notice: Subject to any disclaimer, the term of this patent is extended or adjusted under 35 U.S.C. 154(b) by 132 days.

(21) Appl. No.: 18/078,618

(22) Filed: Dec. 9, 2022

(65) Prior Publication Data

US 2023/0188364 A1 Jun. 15, 2023

(30) Foreign Application Priority Data

Dec. 9, 2021 (GR) .............................. 20210100862

(51) Int. Cl.
*H04L 29/06* (2006.01)
*H04L 9/08* (2006.01)
*H04L 9/30* (2006.01)
*H04L 9/32* (2006.01)
*H04L 9/40* (2022.01)

(52) U.S. Cl.
CPC .......... *H04L 63/123* (2013.01); *H04L 9/0863* (2013.01); *H04L 9/3073* (2013.01); *H04L 9/3268* (2013.01)

(58) Field of Classification Search
CPC .................................................... H04L 63/123
See application file for complete search history.

(56) References Cited

U.S. PATENT DOCUMENTS

| | | | |
|---|---|---|---|
| 6,944,762 B1 * | 9/2005 | Garrison ................. | H04L 9/083 713/168 |
| 7,233,669 B2 * | 6/2007 | Candelore .............. | H04N 7/167 380/201 |
| 9,537,657 B1 * | 1/2017 | Char ...................... | H04L 9/0637 |
| 2004/0039908 A1 * | 2/2004 | Rose ...................... | H04L 9/0637 713/168 |

* cited by examiner

*Primary Examiner* — Bradley W Holder
(74) *Attorney, Agent, or Firm* — McDermott Will & Emery LLP

(57) ABSTRACT

Various aspects of the subject technology relate to systems, methods, and machine-readable media for providing encryption of data with data separation. Various aspects may include performing determining a request payload for a communication from a client device. Aspects may also include creating a first reference data object for a first subset of data fields of the request payload. Aspects may also include creating a second reference data object for a second subset of data fields. Aspects may also include replacing a first value of the first subset with a first reference value. Aspects may include replacing a second value of the second subset with a second reference value. Aspects may include encrypting a response payload with the first reference data object and the second reference data object in an encrypted text-based structured data file format with a cryptographic key.

20 Claims, 6 Drawing Sheets

PARTIAL PAYLOAD ENCRYPTION WITH INTEGRITY PROTECTION

CROSS REFERENCE TO RELATED APPLICATION

The present application is related to and claims the benefit of priority under 35 U.S.C. § 119(a) to Greek Patent Application No. 20210100862, filed Dec. 9, 2021, the disclosure of which is hereby incorporated by reference in its entirety for all purposes.

TECHNICAL FIELD

The present disclosure generally relates to an encryption method that addresses data separation requirements and more particularly to an encrypted reference data object (e.g., data object in a structured data interchange format for a payload) that implements selective data visibility via replacing sensitive information with reference values.

BACKGROUND

Some computer networking architectures involve a requirement to isolate portions of sensitive or confidential data for components of the same architecture. For example, the architecture may include multiple layers with different data usage requirements. For example, the different multiple layers may have different reasons or functions for data usage. It may be beneficial to have an encryption protocol that addresses these varying requirements, such as communication verification and payment processing. Different cryptographic features, such as cryptographic keys, may be used for the encryption protocol to apply tailored encryption features according to the different data usage requirements.

BRIEF SUMMARY

The present disclosure provides for systems and methods for providing encryption of data with data separation. For example, the present disclosure may involve a system with multiples layers having varying data separation requirements and localization requirements. As an example, data collected from a client should be visible to a payment processing server but not a messaging/routing server. The messaging server can function as a middle entity as described herein, which can provide integrity protection without accessing sensitive or confidential data sent from the client to the payment processing server. The client and the payment processing server can communicate via an encryption mechanism that supports two way communication via shared and/or derived keys (e.g., ephemeral, Diffie-Hellman key pair, etc.) for encryption and signing intents from the client. In other words, the system may comprise a client and two or more different types of servers, such that a partial payload encryption mechanism via different key pairs and replacement reference values (e.g., reference identification) that accounts for varying data separation requirements for the two or more different types of servers advantageously can be provided. The different key pairs can be provided for different services, such as different services that the payment processing server functions as a gateway for.

The present disclosure may provide a technical solution to a problem arising in the computer networks and/or encryption. Advantageously, the present disclosure enables an improved encryption architecture that addresses layers having different data usage and/or visibility requirements. In particular, for two way client and server encryption, original payload field names (e.g., sensitive client information) can be substituted for reference IDs. Reference IDs can be generated via a hashing algorithm to generate a reference prefix. In this way, confidential or sensitive information can be encrypted or otherwise rendered invisible relative to the messaging server while being decryptable by the payment processing server. Moreover, nonconfidential information can remain in plain text form in the encryption payload. The encryption payload may be or include a reference based JavaScript Object Notation (JSON) object or other suitable encrypted data object. The payment processing server may receive an encrypted mapping of reference ID to original value to decode the encrypted confidential information in the JSON object. Accordingly, the present disclosure advantageously may provide partial encryption that addresses varying needs for varying data separation and/or usage requirements. Advantageously, the present disclosure can provide end-to-end encryption (E2EE) to secure data between the client and payment processing server without the messaging server reading or modifying a confidential subset of data sent from the client.

According to one embodiment of the present disclosure, a computer-implemented method for encryption of data with data separation is provided. The method includes determining a request payload for a communication from a client device. The method also includes creating a first reference data object for a first subset of a plurality of data fields of the request payload that correspond to a first service. The method also includes creating a second reference data object for a second subset of the plurality of data fields corresponding to a second service. The method also includes replacing a first value of the first subset with a first reference value. The method also includes replacing a second value of the second subset with a second reference value. The method also includes encrypting a response payload with the first reference data object and the second reference data object in an encrypted text-based structured data file format with a cryptographic key.

According to one embodiment of the present disclosure, a system is provided including a processor and a memory comprising instructions stored thereon, which when executed by the processor, causes the processor to perform a method for providing encryption of data with data separation. The method includes determining a request payload for a communication from a client device. The method also includes creating a first reference data object for a first subset of a plurality of data fields of the request payload that correspond to a first service. The method also includes creating a second reference data object for a second subset of the plurality of data fields corresponding to a second service. The method also includes replacing a first value of the first subset with a first reference value. The method also includes replacing a second value of the second subset with a second reference value. The method also includes encrypting a response payload with the first reference data object and the second reference data object in an encrypted text-based structured data file format with a cryptographic key.

According to one embodiment of the present disclosure, a non-transitory computer-readable storage medium is provided including instructions (e.g., stored sequences of instructions) that, when executed by a processor, cause the processor to perform a method for providing encryption of data with data separation. The method includes determining a request payload for a communication from a client device. The method also includes creating a first reference data object for a first subset of a plurality of data fields of the request payload that correspond to a first service. The method also includes creating a second reference data object for a second subset of the plurality of data fields corresponding to a second service. The method also includes replacing a first value of the first subset with a first reference value. The method also includes replacing a second value of the second subset with a second reference value. The method also includes encrypting a response payload with the first reference data object and the second reference data object in an encrypted text-based structured data file format with a cryptographic key.

According to one embodiment of the present disclosure, a non-transitory computer-readable storage medium is provided including instructions (e.g., stored sequences of instructions) that, when executed by a processor, cause the processor to perform a method for providing encryption of data with data separation. The method includes determining a request payload for a communication from a client device. The method also includes creating a first reference data object for a first subset of a plurality of data fields of the request payload that correspond to a first service. The method also includes creating a second reference data object for a second subset of the plurality of data fields corresponding to a second service. The method also includes obtaining a first cryptographic key for the first service and a second cryptographic key for the second service for endpoint encryption according to the first service and the second service. The method also includes replacing a first value of the first subset with a first reference value. The method also includes replacing a second value of the second subset with a second reference value. The method also includes encrypting a response payload with the first reference data object and the second reference data object in an encrypted text-based structured data file format with a cryptographic key. The method also includes verifying a signed intent based on a serialization according to the first service or the second service via a signature key. The method also includes permitting, based on verifying the signed intent, execution of an action requested by the client device.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
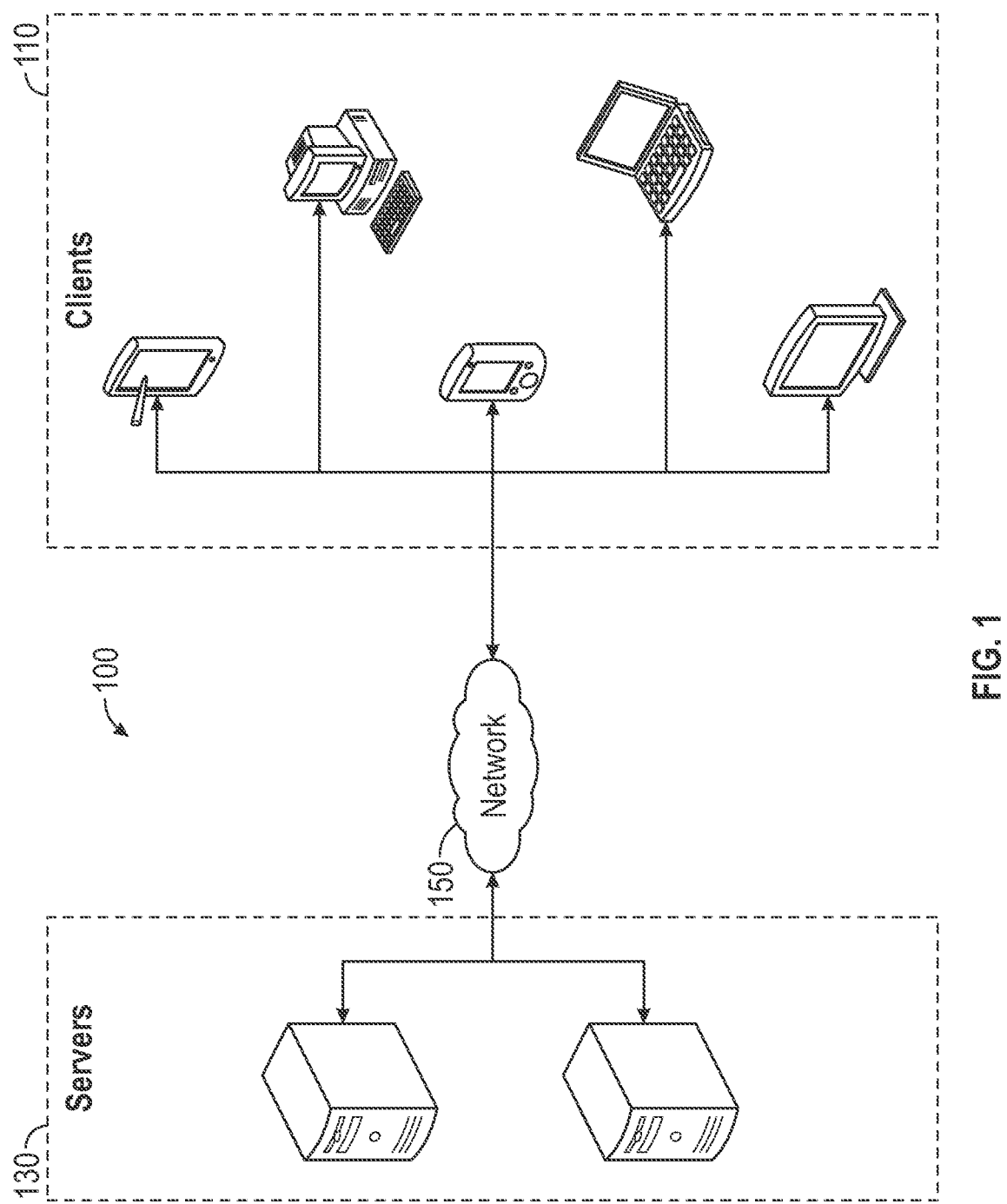
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the present disclosure. Additional components, different components, or fewer components may be utilized within the scope of the present disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the included clauses. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art, that embodiments of the present disclosure may be practiced without some of the specific details. In other instances, well-known structures and techniques have not been shown in detail so as not to obscure the disclosure.

The disclosed system addresses a problem in computer networks and computer encryption technology, namely, the technical problem of encryption in a computer system with data separation requirements. For example, the requirements may indicate that confidential data should not be communicated, be stored, or flow through the computer system as plain text. Encryption can be applied partially and/or differently depending on what type of service is provided by a payment processing server. As an example, the provided services can include authentication services, media services, financial services, and/or the like. Each service may have a corresponding cryptographic key or keys, such as a key for encrypting images or photo identifications for the authentication services. The keys can be part of a Diffie-Hellman X25519 cryptographic key exchange, for example. A client can fetch keys from the payment processing server and validate the keys against a root certificate corresponding to the computer system (e.g., to verify the keys are issued properly). The keys can be used to decrypt JSON reference ID replacement used to protect data (e.g., render data inaccessible or otherwise not visible) from intermediate entities in the computer system. This JSON reference ID encryption method may enable intermediate entities to forward data and verify client requests without confidential information from the client being made visible to the intermediate entities.

In this way, the disclosed computer system may enable partial encryption while addressing varying data separation requirements corresponding to each of the different services provided by the payment processing server. The keys can be registered for partial or selective encryption of information or data relative to intermediaries (e.g., an intermediate messaging server). That is, a subset of confidential data for a request sent by the client to the payment processing server can be encrypted with respect to the intermediary but be decryptable by the payment processing server. For example, for the authentication services, the client may obtain a public authentication key from the payment processing server. The client may use the public authentication key and an ephemeral client generated key to derive a common secret shared between the client and the payment processing server to encrypt a password of the authentication services. The password can be used for authentication on the payment server. The password can be encrypted with the partial payload encryption framework. This structure beneficially can account for the data separation requirements. The password being encrypted can be in a particular encryption format such as including version code, key ID, flag (e.g., what type of encryption of padding is being used), ciphertext information (e.g., AES encrypted password information), authentication tag or data, and/or the like.

When a client request is received, the ephemeral public key (e.g., for one time use for a particular action) can be used by the payment processing server along with the private authentication key of the payment processing server to derive the common secret. That is, for encrypting a request and/or response payload, the common secret can be derived from an Elliptic Curve Diffie-Hellman (ECDH) key agreement protocol so that the client and the payment processing server can encrypt and decrypt the payload(s). As an example, the password in the request payload can be encrypted (while the other non-sensitive fields may still be in plaintext) via the derived key, and can be decrypted by the payment processing server to authenticate the requesting user. The request payload can include a public key that can be obtained and saved by the payment processing server via after authentication, for integrity protection of the future events. In this way, the public key from the client can be registered with the payment processing server. As described herein, the payment processing server can use its private authentication key and public key received from the client to encrypt the response payload. The encryption scheme and/or signature scheme used by the computer system can be or include ECDH, ephemeral X25519 key pairs, Advanced Encryption Standard Galois/Counter mode (AES-GCM) symmetric cryptographic keys, HKDF key derivation, JSON reference ID encryption, SHA-256 cryptographic hash algorithm (e.g., 256 bit signature for texts or other messages from mobile devices such as smartphones), ElGamal signature scheme, or any other suitable digital signature and/or encryption scheme.

FIG. 1 is a block diagram of a device operating environment with which aspects of the present disclosure can be implemented. FIG. 1 illustrates an exemplary network architecture 100 to provide encryption of data with data separation, according to some embodiments. The network architecture of FIG. 1 includes one or more client devices 110 and one or more servers 130 which are communicatively coupled through the network 150. The one or more client devices 110 may be clients of computer network based messaging services, payment services, media services, and/or the like. The one or more servers 130 provide services such as Internet based services including the messaging services, payment services, and media services, for example, to the client devices 110 in the device operating environment. The one or more servers 130 can include a back-end server and an intermediary server, although not specifically illustrated in FIG. 1, in this manner. Data separation requirements can apply to the back-end server and the intermediary server. As such, the back-end server of the one or more servers 130 may communicate with the one or more client devices 110 for a shared key for encryption and decryption, such as an ephemeral ECDH symmetric key exchange with AES-256 and with SHA-256 for signing intent by the one or more client devices 110.

In this way, the intermediary server advantageously can be bypassed without compromising confidential information shared by the one or more client devices 110. Moreover, as described herein, because data needs to be routed by the intermediary server to the back-end server of the one or more servers 130, a reference ID based JSON encryption can be applied to protect the security of field names in a request payload that could otherwise leak confidential information. In particular, confidential data such as sensitive field names in the request payload can be replaced with randomly generated reference IDs used in the encrypted version of the request payload. In this way, the intermediary server can perform integrity protection of the encrypted request payload being routed to the back-end server of the one or more servers 130 without improperly accessing the confidential field name data of the request payload. The secure shared key exchange between the back-end server of the one or more servers 130 and the one or more client devices 110 may be used to generate an ephemeral shared key to enable the back-end server to decrypt the encrypted JSON reference IDs and those values in the original request payload with the actual decrypted values.

The network 150 may include a wired network (e.g., via fiber optic or copper wire, telephone lines, and the like) or wireless network (e.g., a cellular network, radio-frequency (RF) network, Wi-Fi, Bluetooth, and the like). The client devices 110 may be any one of a mobile device, a laptop, a desktop, a tablet (e.g., palm or pad) device, a television, a display device, and/or the like. The client devices 110 can be controlled by a user to request services, such as via the mechanisms described herein. The requests by the client devices 110 can be in the form of encrypted request payloads sent to the intermediary server for routing to the back-end server of the one or more servers 130. The client devices may receive encrypted response payloads from the back-end server. The request and response payloads can be decrypted via secure generation of shared secrets and/or cryptographic keys as described herein. Multiple client devices 110 may have access to the device operating environment hosted by the servers 130 via an online or offline connection, such as a wireless connection, wired connection, ad hoc connection, mobile connection, satellite connection, and/or the like. Each of the servers 130 may be a computing device such as part of a cloud computing server including one or more desktop computers or panels mounted on racks, and/or the like. The panels may include processing boards and also switchboards, routers, and other network devices.

Figure 2:
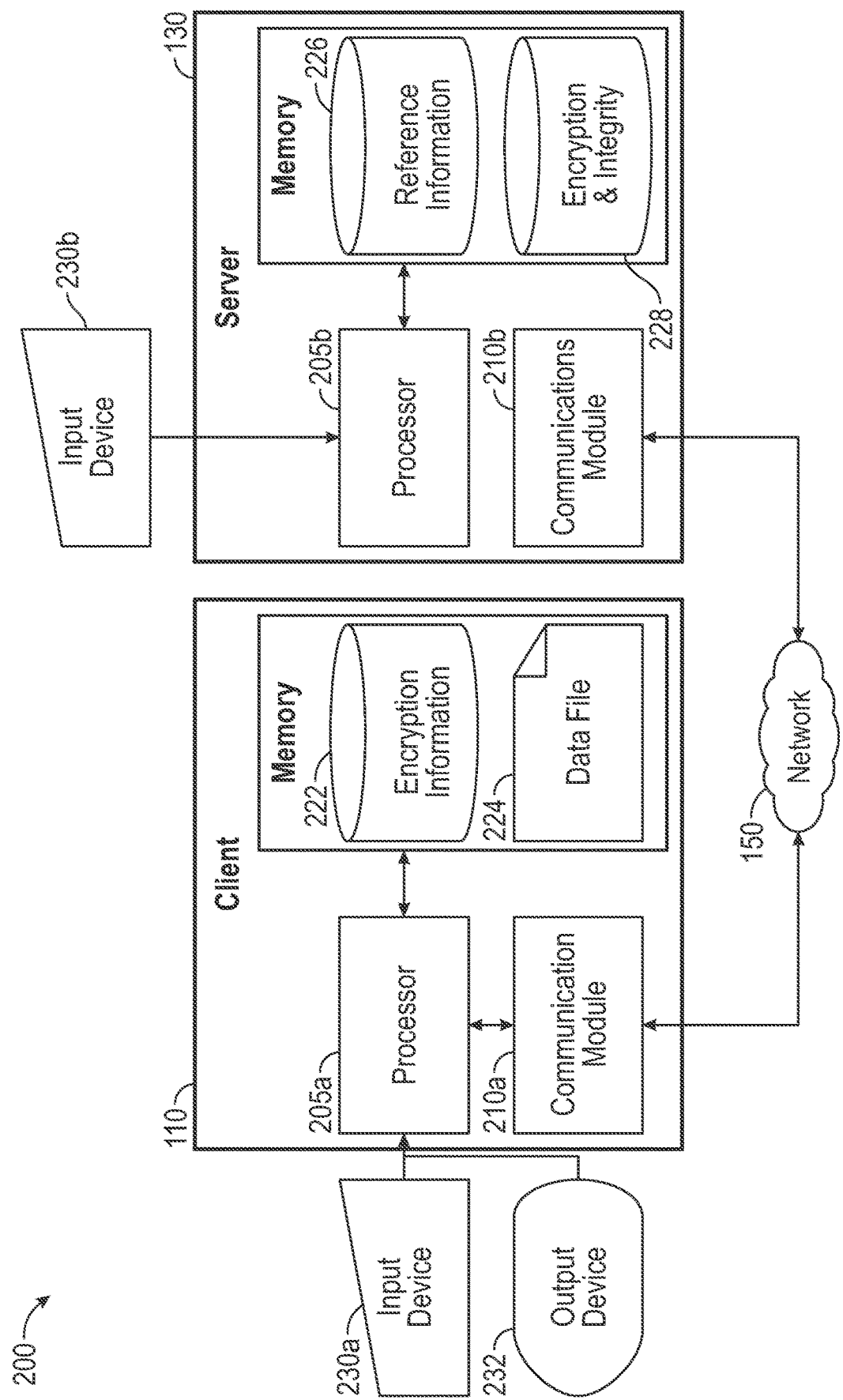
FIG. 2 is a block diagram of an example computing network of an example computer system for providing encryption of data with data separation, according to certain aspects of the present disclosure.

FIG. 2 is a block diagram of an example computing network 200 of an example computer system for providing encryption of data with data separation, according to certain aspects of the present disclosure. A subset of data being sent or received can be secured and/or encrypted with assurances for confidentiality and integrity depending on how or where data is flowing through the example computer system. As such, the computer system can provide secured two way communication, such as between the client device 110 and the server 130 of the example computing network 200 pictured in FIG. 2, with a flexible and resilient key management scheme that has a minimal impact on computational performance. The key management scheme can include an ECDH key exchange/agreement protocol to securely generate an asymmetric key for encryption of messages between the client device 110 and the server. Other suitable cryptographic generation and/or exchange protocols can be used. Moreover, JSON reference values can be used in combination with the key management scheme for partial signing and encryption (e.g., only for sensitive data) with integrity protection. The partial signing and encryption implemented by the computing network 200 can avoid undesirable access or visibility of confidential data by a "man in the middle" intermediate component (e.g., intermediate server) that is situated in the middle of the communication between the client device 110 and the server 130. Accordingly, the example computer system can implement point-to-point encryption to secure sensitive or confidential information against the intermediate component, in contrast to conventional communication architectures such as web service communication with Transport Layer Security (TLS).

In a request from the client device 110, a certain subset of fields may need to be visible to an intermediate web server to process the request, but the information within those fields may be confidential. Accordingly, the use of JSON reference IDs advantageously can replace the field names (e.g., actual values) so that the confidential information remains confidential and the intermediate web server can validate that such fields exist within the request. For example, the client request can be denied if such fields do not exist. For fields that contain non-sensitive information, those fields may remain in plain text. A secured and/or encrypted JSON array may be provided that contains JSON ID mapping so that the server 130 may determine how to decrypt the JSON reference IDs in the request from the client device 110. This JSON ID replacement and mapping can provide data separation relative to the intermediate web server that may route the request to the server 130 while also enabling the web server to ensure that the request message is correctly constructed/formatted. In other words, the intermediate web server may verify the presence of fields and/or values, including confidential personal information, without actually having access to the confidential information (e.g., due to the JSON reference IDs) while also being capable of verifying the correct format of the request message (e.g., based on determining the presence of the encrypted JSON ID field names).

The client device 110 and the server 130 may access each other and other devices in the network 150 via corresponding communications modules 210a-210b, such as via the intermediate web server. The communications modules 210a-210b may each include radio hardware and software such as RF antennas, analog circuitry, digital to analog conversion circuits, digital signal processing circuitry, and/ or the like. The client device 110 and the server 130 may send and receive messages such as via JSON payload in a point-to-point encryption format, such as via ECDH cryptographic key agreement protocol. In this way, data can be sent securely in request and response payloads between the client device 110 and the server 130, for example. The server 130 can initiate communication such as asynchronous notifications, such as a push notification via the intermediate web server to indicate that the server 130 is sending an encrypted response payload that is decryptable via an ECDH derived symmetric key.

The client device 110 and server 130 depicted in FIGS. 1-2 may each include a processor 205a-205b and memory 220a-220b, respectively. The processor 205a of the client device 110 may be used to operate the client device 110, such as to execute applications and functions thereof rendered on the client device 110 and to send API requests to the server 130 for services such as messaging applications, media applications, payment processing applications, and/or the like. As discussed herein, the JSON payload can be a response payload from the server 130 in which the original values of the request payload from the client device 110 representing confidential information can be replaced by JSON reference ID values. In this way, the web server can assess the correctness (e.g., formatting and authenticity) of the request payload without viewing the confidential information. The JSON reference ID values and/or mapping to original values (e.g., in a JSON array) can be stored in the database 226 of the server 130.

The client device 110 can use encryption information located in the database 222 and the data file 224, such as to generate an ephemeral key pair for decryption by the server 130 as well as derived service specific keys for field-by-field encryption for corresponding services. For example, the services can include an authorization service, digital facade service, risk services, media services, and/or the like. The processor 205b of the server 130 may be used to implement a digital payment facade service that can function as a gateway for the corresponding services. By having different service specific keys, data separation advantageously can be achieved relative to different services provided by the server 130. The various specific services can function as different end points for the point-to-point encryption. The processor 205b may also coordinate encryption and integrity verification information from the intermediate web server via the database 228. For example, the processor 205b can verify that the request payload is an authentic request actually being sent by the client device 110 as well as verify the formatting of the response payload from the server 130, such as to ensure the response payload and/or request payload conforms with communication protocols including to Extensible Messaging and Presence Protocol (XMPP) or REST requirements and is otherwise correctly constructed as a message.

For example, the processor 205b may identify, based on the database 228, subsets of a request payload or response payload that should be encrypted due to confidential information such as a user identification or user password as well as subsets that can be rendered in plain text. The intermediate web server can verify that the subset of the request payload or response payload include field names that are properly formatted or constructed. For example, the intermediate web server may verify which subsets correspond to field names with personal confidential information and which correspond to non-confidential information. The intermediate web server may be aware of the accuracy of the non-confidential information represented by field names as well as the reasoning for the encryption for field names having confidential information which can be routed by the intermediate web server in the request or response payload for decryption by the server 130 or client device 110, respectively, with their securely generated shared secret(s) and/or cryptographic key(s). As an example, because the intermediate web server is aware that an encrypted part of the request payload represents a user ID or a password (though the intermediate web server cannot read or access the confidential information), the intermediate web server can correctly route the request payload while also maintaining data separation requirements of the example computing network 200.

Generally, the client device 110 and the server 130 comprise computing devices including at least: the memory 220a-220b storing instructions and processors 205a-205b configured to execute the instructions to perform, at least partially, one or more steps as described in methods disclosed herein. For example, the memory 220a of the client device 110 may be used to gain access to a browser, service, or application component of the example computing network 200. For example, the client device 110 can be in communication with the server 130 to send request payloads for requesting payment or financial services. The request payloads being sent have JSON reference IDs to substitute for confidential information, as described herein. For example, a value in the JSON request payload object can have an actual value for the field such as a name or date of birth. Because this information is confidential, the field name for date of birth can be replaced by a JSON reference ID, in which the mapping to original field name value to JSON reference can be securely decrypted by the server 130 based on a shared cryptographic secret/key protocol between the client device 110 and the server 130.

This original value to JSON reference ID conversion can be derived and stored as reference information in the database 226 for access by a back-end server. In this way, the intermediate web server can verify the integrity of the request payloads by verifying that the date of birth field exists and is formatted correctly, but cannot read or determine the actual confidential date of birth value that the back-end server may access, for example. The intermediate web server can ensure that the request payloads and response payloads are formatted correctly according to mutually readable or communicable serialization scenes, for example, since the client device 110 and server 130 may use a different serialization scheme. As an example, the payload structures used herein can include compressed data that is readable for various serialization schemes. For example, the compressed data can have a specific configuration for concatenating fields, which can be readily decomposed afterwards. In this way, the intermediate web server can function as a mediator between different serialization schemes, such as routing the original request payload or response payload while maintaining the original serialization scheme which can enable integrity protection to ensure that the sent or received payloads are authentic and not maliciously altered after being sent.

An input device 230b can be used for the server 130 to define what types of services are supported by the example computing system 200, such as authentication services, media services, and financial services. The services or particular options for services provided by the server 130 can be indicated via user/operator input, such as via an input device 230a. The data file 224 stored in the memory 220a can include application settings, files, and data specific to the associated user of the client device 110. The client device 110 may be used by a user of the example computing system 200, such as to transfer or send money, such as via a graphical user interface (GUI) screen rendered on the client device 110. For example, the client device 110 may be coupled to at least one input device 230a and output device 232 accessible by the user (e.g., for user input and output perceivable by the user). The input device 230a can include a mouse, keyboard, a pointer, a stylus, a touchscreen display, microphone, voice recognition software, graphical user interface (GUI), and/or the like. The output device 232 can include a display (e.g., the same touchscreen display as the input device), a speaker, an alarm, and the like.

Although the above description describes certain functions being performed by the processor 205a of the client device 110 and other certain functions being performed by the processor 205b of the server 130, all of the functions described herein can be performed by the client device 110 and/or the server 130 in some other alternative division of labor. That is, the processors 205a, 205b could perform more or less of the functions described above. In some embodiments, some or part of the client device 110 can be co-located with the server 130. That is, the server 130 can be remote from or both the client device 110 and the server 130 can be part of the same larger computing system, network, or architecture.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
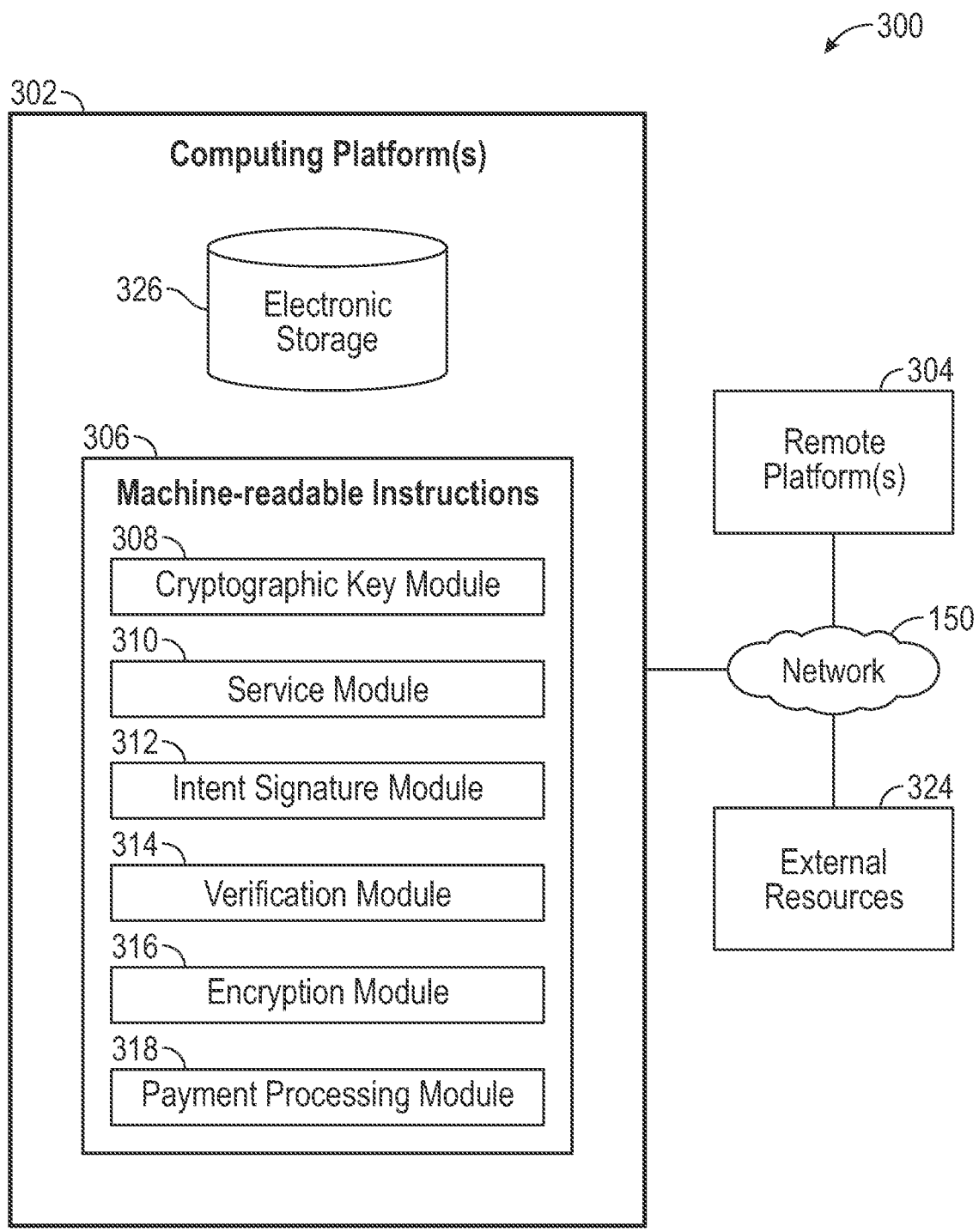
FIG. 3 is a block diagram illustrating an example computer system with which aspects of the subject technology can be implemented.

FIG. 3 is a block diagram illustrating an example computer system 300 with which aspects of the subject technology can be implemented. The system 300 may be configured for providing encryption of data with data separation, according to certain aspects of the disclosure. In some implementations, the system 300 may include one or more computing platforms 302. The computing platform(s) 302 can correspond to a server component of a trusted execution environment platform, which can be similar to or the same as the server computing device(s) 130 of FIG. 1 and include the client computing device(s) 110 of FIG. 1. The computing platform(s) 302 can be configured to provide a flexible and secure key management scheme as well as JSON reference ID substitution (e.g., for original values of request payloads from client devices of the remote platform(s) 304), such as to protect the identity of field names in the request payloads. In particular, the computing platform(s) 302 can automate the use of the JSON reference IDs for automating the encryption scheme applied by the system 300, as described herein. The automation may enable the use of the same encryption method for both grouping private information (in a secured manner) and non-private in a single reference-based JSON payload before encryption, such in an encrypted response payload. That is, a subset/portion of the JSON payload can be encrypted and another subset/portion can be unencrypted in the same payload.

The computing platform(s) 302 may be configured to communicate with one or more remote platforms 304 according to a client/server architecture, a peer-to-peer architecture, and/or other architectures. The remote platform(s) 304 may be configured to communicate with other remote platforms via computing platform(s) 302 and/or according to a client/server architecture, a peer-to-peer architecture, and/or other architectures. Because components of the computing platform(s) should be subject to data separation requirements, the computing platform(s) 302 may use JSON reference ID replacement of original values in client requests from client devices of the remote platform(s) 302 to achieve routing of client requests with limited visibility of the original values for particular portions computing platform(s) 302. For example, intermediate "man in the middle" components of the computing platform(s) 302 can route client requests with JSON ID values substituted for field names to disguise confidential information in the client requests while enabling the intermediate components to perform integrity and authentication protection to verify that the client requests came from the correct client device instance and were not tampered with. In this way, the computing platform(s) 302 advantageously can provide partial or selective encryption with integrity protection and address varying data separation requirements.

The computing platform(s) 302 may be configured by machine-readable instructions 306. The machine-readable instructions 306 may be executed by the computing platform(s) to implement one or more instruction modules. The instruction modules may include computer program modules. The instruction modules being implemented may include one or more of cryptographic key module 308, service module 310, intent signature module 312, verification module 314, encryption module 316, payment processing module 318, and/or other instruction modules.

The cryptographic key module 308 can control the generation of key pairs, such as computation of ECDH X25519 key pairs (e.g., ephemeral). Key pairs may also be generated according to other suitable key generation schemes. The cryptographic key module 308 can also generate keys for signing intents by client devices of the remote platform(s) 304, such as elliptic-curve cryptography (ECC) P-256 key pairs. Ephemeral keys generated by the cryptographic key module 308 can be applied for a one time use, such as a first ephemeral key for a first request to send money to a first recipient and a second ephemeral key for a second request to send money to a second recipient. In other words, a used ephemeral key can be deleted/removed and a new ephemeral key can be created for ECDH of a different request. The cryptographic key module 308 can manage the creation of ephemeral ECC X25519 key pairs, such as KEPH and KEPHserv keys for encryption of the request payloads and response payloads. As an example, the computing platform(s) 302 (e.g., payment processing back-end server) can derive an encryption key for encrypting a particular response payload based on the server's public key and a private ephemeral key such as KEPHservpriv of the ephemeral key pair. As an example, client devices of the remote platform(s) 304 can use client generated ephemeral key pairs with client device private key to encrypt a particular response payload. In general, the cryptographic key module 308 can control generation of cryptographic key pairs for encryption and decryption of payloads as well as JSON reference value based encryption.

The service module 310 can manage a plurality of different services, such as services related to payment processing. The services can include a payment facade service (e.g., financial and/or payment services), authentication service, a media service, a risk service and/or the like. For example, the media service can include or involve identification photos, such as pictures of driver's licenses. For example, the authentication service can involve user identification or password data. For example, the payment facade service can include financial data not handled by the media service and the authentication service. The service module 310 can be provided to client devices of the remote platform(s) 304 via a mediator, such as an intermediate server (e.g., man in the middle) for routing requests from the client devices for services. As an example, the intermediate server may perform integrity protection and routing with reserialization for the different services so the requests can be managed by the service module 310. As discussed herein, the integrity protection and routing can be performed with partial encryption for data separation requirements such as based on JSON reference ID replacement. The communication path for the services module 310 can be in a point-to-point encryption scheme, which can resemble the use of TLS channels for the client device to communicate with the mediating intermediate server and the final service destinations for the plurality of different services provided by the computing platform(s) 302 with partial visibility including encryption for confidential client information routed by the intermediate server.

As an example, the payment facade service can function as a gateway for the authentication service, the media service, and the risk service, which can have their own cryptographic keys for managing data associated with their respective services. In this way, the service module 310 can manage data separation of corresponding data for the various provided plurality of different services. For example, the payment facade service can be prevented from accessing sensitive authentication data managed by the authentication service and vice versa. For example, service specific passwords can be encrypted based on service specific keys from the cryptographic key module 308, such as KWC, KAUTH, and KMEDIA for the payment facade service, authentication service, and media service for encrypting service specific confidential/sensitive data. Accordingly, the various provided plurality of services can act as endpoints for the payment processing back-end server of the computing platform(s) 302. Thus, an encrypted JSON payload may be selectively encrypted to contain subsets of encrypted information respectively specific to any one of the plurality of services as well as unencrypted parts.

The intent signature module 312 may be used to sign intents based on the ECC P-256 key pair for signatures. The signed intents via the intent signature module 312 can be used for particularly sensitive actions, such as sending money via the remote platform(s) 304 and/or computing platform(s) 302. For example, a particular encrypted JSON object can be created with sender and receiver phone numbers as well as amount of money. The particular encrypted JSON object can indicate the intent of the corresponding action, such as for sending money. The particular encrypted JSON object can be compiled into a JSON web signature (JWS) format by the intent signature module 312 and sent to the computing platform(s) 302 so that the payment processing server of the computing platform(s) 302 can validate if the signed objected is properly signed by a corresponding cryptographic key, such as if the cryptographic key is a public key previously registered by the corresponding user. If this is validated successfully, the sending money action can be enabled to proceed. This intent structure can ensure that the sending money action is sent from the correct corresponding user, such as to prevent malicious or inappropriate swapping of different users' requests. The sending money action can include encrypted details that cannot be altered by the intermediate server, such as phone number, amount of money being sent, sender and receiver information, and/or the like.

As an example, the intent signature module 312 can create two intents for a login request including login intent and encryption key registration intent. The intent signature module 312 may create statements for both of these intents and sign these intents using a private key, encoding the signed request along with the signature using JWS format for a given client device of the remote platform(s) 302. When the required payload is signed via the intent signature module 312, a final request payload for the given client device can be constructed and sent to the intermediate server with fields for login intent and key registration intent. The intermediate server can send the intents as well as other fields to the payment facade service by calling a login remote procedure call (RPC) query over a communication protocol (e.g., Thrift), for example.

The verification module 314 can verify whether field names indicate that corresponding request payloads from client devices of the remote platform(s) 304 are valid. Such field names can be verified as part of integrity protection by the verification module 314, which can be performed by an intermediate component of the example computer system 300, such as a web server. The verification can be based on a verification key derived by the verification module 314 after the ECDH key pair generation is performed. The derived key can include or correspond to a message authentication code (MAC) which can be generated for each request or response payload. In this way, the verification module 314 can verify the integrity of the corresponding request payloads as well as any response payloads received by the client devices of the remote platform(s) 304. The verification module 314 and the intent signature module 312 may perform signature verification. For example, for the encrypted password that is encrypted against the authentication service, the payment facade service can send the encrypted password with the signed intent to the authentication service for decryption. The verification module 314 can verify the signed intent based on a service specific serialization, such as the serialized JSON intent and signature extracted via encryption tokens (e.g., JWS tokens).

The authentication service can decode the login intent and encryption key intents JWS tokens present in the request to extract the serialized JSON intent and signature. The signature can be verified by the verification module 314 using the public signing key that is sent in the request from the given client device. The signing and decryption public keys along with decryption key identification may also be saved on a corresponding server component of the computing platform(s) 302 for subsequent use. For decryption, the authentication service can extract a payment facade service public key from the encrypted password. The authentication can derive a password AES key. The derived password AES key can be used for password decryption.

As discussed herein, the encryption module 316 can encrypt a subset of field names that identify sensitive information (e.g., personally identifiable information) based on replacing the sensitive information with JSON reference IDs in request payloads from by client devices of the remote platform(s) 304. Another subset of field names in such request payloads can be non-encrypted such that the corresponding field names remain in plain text. That is, field names that have personally identifiable information or other sensitive/confidential information can be replaced with JSON reference ID values. The JSON reference ID values can be randomly generated and used in encrypted payloads from/to client devices of the remote platform(s) 304 or from/to payment processing back-end server of the computing platform(s) 302. In this way, the encryption module 316 can route or reconstruct payloads from the client devices of the remote platform(s) 304 to send encrypted service-specific information to corresponding instances of the provided plurality of different services via the service module 310.

For JSON reference ID generation, only leaf fields of primitive types can be used for reference IDs (e.g., in contrast to complex objects or sub-JSONs which may be inconsistent with XMPP payloads and not perform JSON merging). The encryption module 316 can generate a short prefix for the JSON reference ID generation at the time of request by the given client device of the remote platform(s) 302 and set a count to zero. As an example, a server component of the computing platform(s) 302 (e.g., different from the intermediate server that routes the JSON payloads/requests) can set, for each field name that needs to be assigned a reference ID, a corresponding field value. Then, the actual or original value being substituted with the JSON reference ID can be placed in a map with the reference ID as the key and original value as the value. As such, the encryption module 316 can maintain a mapping of the JSON reference IDs to their corresponding substituted value so that the payment processing back-end server of the computing platform(s) 302 can decrypt the encrypted JSON and determine the original values encrypted by the JSON reference IDs.

Because a subset of the field names in request payloads received by the payment processing back-end server can be encrypted while another subset can remain in plain text, the request payloads can be partially encrypted as well as contain data that can be routed by the payment processing back-end server to the respective different services controlled by the service module 310. The encryption module 316 may perform an error check to determine/verify that there are no conflicts in the JSON (e.g., reference IDs each matching some real value). If a conflict is determined to exist, the encryption module 316 can generate a new random short prefix and again generate the corresponding prefix for the corresponding field name of the given request from the given client device of the remote platform(s) 302. The corresponding prefix can be attached to the given request. The encryption module 316 may also attach an encrypted map of reference ID to value to the given request so that the payment processing back-end server can perform decryption based on the mapping.

This reference ID prefix generation can be repeated for all of the subset of field names being encrypted. As such, for decryption, the payment processing back-end server can perform simple replacement in a string for every key in the map to determine the original values that were replaced with JSON reference IDs. The encryption module 316 may generate reference ID prefix based on a hashing algorithm or other hash based technique. As an example, a predefined salt (e.g., ref_id_salt) can be used for a SHA256 hash, such as a unique fixed size 256-bit (32-byte) hash. The first two bytes of the hash can be hexed for the prefix. The encryption module 316 can check if there is a match with an existing field value and set salt=hash(salt). This process may be repeated until there is no match.

The encryption module 316 can also encrypt information for client request payloads from client devices of the remote platform(s) 304 to the payment processing back-end server of the computing platform(s) 302. For example, password information may be encrypted against the authentication service. For such client and server encryption, the encryption module 316 can generate an ephemeral key pair of private and public auth keys. In this way, a shared agreement or secret can be used for symmetric encryption and decryption between the client devices and payment processing back-end server. The encryption module 316 may encrypt the password information using AES-GCM with PKCS7Padding to construct an encrypted password.

The payment processing module 318 can manage various financial services provided to client devices of the remote platform(s) 304. For example, the payment processing module 318 may provide services of a digital wallet, such as including sending and receiving money securely (e.g., via cryptocurrency). As an example, the payment processing module 318 may perform operations for currency conversion and remittances. A digital wallet account can be established for participating client devices of the remote platform(s) 304. The payment processing module 318 may impose limitations or conditions regarding a quantity of transactions engaged with as well as a value of currency sent or received per unit of time. The payment processing module 318 can implement communicative links between the digital wallet and external accounts, such as external accounts to withdraw currency via bank deposit. Furthermore, the payment processing module 318 may manage an application for the digital wallet such as a mobile app or desktop computer application.

In some implementations, the computing platform(s) 302, the remote platform(s) 304, and/or the external resources 324 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 may be operatively linked via some other communication media.

A given remote platform 304 may include client computing devices, which may each include one or more processors configured to execute computer program modules. The computer program modules may be configured to enable an expert or user associated with the given remote platform 304 to interface with the system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms. The external resources 324 may include sources of information outside of the system 300, external entities participating with the system 300, and/or other resources. For example, the external resources 324 may include intermediate or mediator server components. In some implementations, some or all of the functionality attributed herein to the external resources 324 may be provided by resources included in system 300.

The computing platform(s) 302 may include the electronic storage 326, a processor such as the processors 205a-205b, and/or other components. The computing platform(s) 302 may include communication lines or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s) 302 may be implemented by a cloud of computing platforms operating together as the computing platform(s) 302.

The electronic storage 326 may comprise non-transitory storage media that electronically stores information. The electronic storage media of the electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). The electronic storage 326 may include one or more of optically-readable storage media (e.g., optical disks, etc.), magnetically-readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 326 may include one or more virtual storage resources (e.g., cloud storage, a virtual private network, and/or other virtual storage resources). The electronic storage 326 may store software algorithms, cryptographic information, information determined by the processor(s) 205a-205b, information received from computing platform(s) 302, information received from the remote platform(s) 304, and/or other information that enables the computing platform(s) 302 to function as described herein.

The processor(s) 205a-205b may be configured to provide information processing capabilities in the computing platform(s) 302. As such, the processor(s) 205a-205b may include one or more of a digital processor, an analog processor, a digital circuit designed to process information, an analog circuit designed to process information, a state machine, and/or other mechanisms for electronically processing information. Although the processor(s) 205a-205b is shown in FIG. 1 as a single entity, this is for illustrative purposes only. In some implementations, the processor(s) 205a-205b may include a plurality of processing units. These processing units may be physically located within the same device, or the processor(s) 205a-205b may represent processing functionality of a plurality of devices operating in coordination. The processor(s) 205a-205b may be configured to execute modules 308, 310, 312, 314, 316, 318, and/or other modules. Processor(s) 205a-205b may be configured to execute modules 308, 310, 312, 314, 316, 318, and/or other modules by software; hardware; firmware; some combination of software, hardware, and/or firmware; and/or other mechanisms for configuring processing capabilities on the processor(s) 205a-205b. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 308, 310, 312, 314, 316, and/or 318 are illustrated in FIG. 3 as being implemented within a single processing unit, in implementations in which the processor(s) 205a-205b includes multiple processing units, one or more of the modules 308, 310, 312, 314, 316, and/or 318 may be implemented remotely from the other modules. The description of the functionality provided by the different modules 308, 310, 312, 314, 316, and/or 318 described herein is for illustrative purposes, and is not intended to be limiting, as any of the modules 308, 310, 312, 314, 316, and/or 318 may provide more or less functionality than is described. For example, one or more of the modules 308, 310, 312, 314, 316, and/or 318 may be eliminated, and some or all of its functionality may be provided by other ones of the modules 308, 310, 312, 314, 316, and/or 318. As another example, the processor(s) 205a-205b may be configured to execute one or more additional modules that may perform some or all of the functionality attributed below to one of the modules 308, 310, 312, 314, 316, and/or 318.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
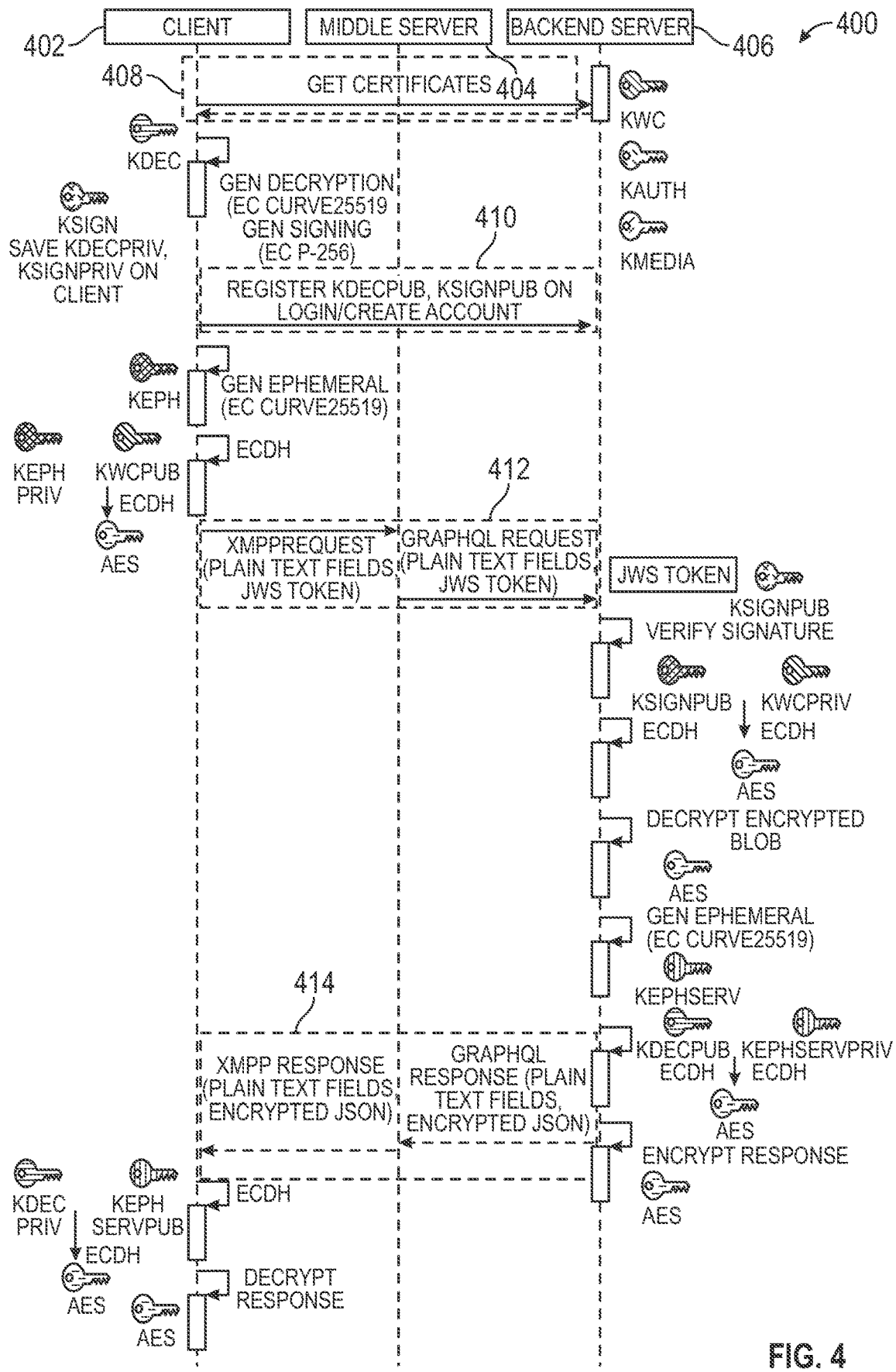
FIG. 4 is a block diagram illustrating an example application trusted execution environment, according to certain aspects of the present disclosure.

FIG. 4 is an example flow diagram 400 for an example of end-to-end encryption between a client device 402 and a server back-end, according to certain aspects of the present disclosure. The example flow diagram 400 illustrates an example data flow between the client device 402, middle server 404, and back-end server 406. The middle server 404 may be considered an intermediate component in a chain of the example data flow. As an example, the back-end server 406 could be a payment processing server while the middle server 404 could be a "man in the middle" messaging web server. Data separation requirements may mean that the intermediate component should not be able to access or read sensitive or confidential data that flows through the example data flow. Data may be routed through all entities in the chain with the end-to-end encryption, but advantageously the middle server 404 or any other intermediate component cannot read or modify a secured subset of the data. Two-way communication between the client device 402 and the middle server 404 and/or back-end server 406 may be provided. In such communication, request payloads from the client device 402 and response payloads from the back-end server 406 can be encrypted and decrypted via a shared secure cryptographic protocol for different services provided via the back-end server 406. The shared secure cryptographic protocol can include replacement of confidential or sensitive information with coded or encrypted data such as JSON reference IDs. In this way, the middle server 404 can perform integrity protection, such as to ensure that payloads are formatted and constructed correctly without reading confidential and/or sensitive information.

At step 408 of the example flow diagram 400, before the client device 402 sends a particular request payload, the client device 402 can obtain cryptographic keys and/or certificates for each provided service. For example, the client device 402 may pin a root canal certificate for validating certificate paths. The root canal can be stored as a hardcoded X.509 certificate string, such as on local memory of the client device 402. As an example, the client device 402 may extract a public key such as KMASTpub via the root canal certificate. KMASTpub can refer to a master public key extracted from the root canal certificate bundled in the client device 402. As used herein, a key with "pub" as a suffix can refer to a public key and a key with "priv" as a suffix can refer to a private key. Public keys and private keys can be paired together to form key pairs, such as KDECpub and KDECpriv of cryptographic key pair for KDEC key pair for client decryption. The client device 402 may obtain certificates for each type of service offered via the back-end server 406. For example, the back-end server can be a gateway for a payment facade service, authentication service, a media service, and/or the like. Accordingly, the client device 402 may fetch X.509 certificates from the back-end server 406 and validate the corresponding certificate paths.

The certificates can be obtained or fetched at a suitable temporal trigger, such as every time a corresponding app (e.g., digital wallet application) starts or before the user of the client device 402 logs in. Based on the obtained leaf certificates, the client device 402 can extract public keys for each type of service such as KWCpub for the payment facade service, KAUTHpub for the authentication service, and KMEDIApub for the media service. The extracted public keys can be generated via a suitable cryptographic scheme, such as an ECC X25519 algorithm. The full certificates obtained for each type of service from the back-end server can be saved in a store or other type of memory of the client device 402. The client device 402 can generate shared and/or symmetric key pairs for encrypted and secure communication with the back-end server 406, as described herein. The encryption provided by the key pairs may enable the middle server 404 to securely route request and response payloads between the client device 402 and the back-end server 406 with integrity protection and with the benefit of not reading confidential data according to applicable data separation requirements. The client device 402 may generate an ECC X25519 key pair for decryption, which can include KDECpub and KDECpriv.

At step 410, the client device 402 may send the KDECpub to the back-end server 406 for key enrollment. Key enrollment can be a registration so that the client device 402 and back-end server 406 can have a shared cryptographic secret/key(s) for encryption and decryption. Key enrollment can occur in conjunction with other actions such as login, create account, password recover, password change, or any other request from the client device 402 in which password information is sent to the back-end server 406. The KDEC key may be locally persistent as a shared preference and can be relatively low-sensitivity because of being applied only for transport encryption. If secure hardware is supported, KDEC can be encrypted with the secure hardware and stored as an encrypted version in the shared preference. KDEC keys (e.g., KDECpriv) may be stored as locally persistent for a period of time, so as to account for circumstances in which the back-end server 406 sends a push notification encrypted with an old KDEC key. That is, older versions of KDEC keys do not necessarily need to be purged when new KDEC keys are generated.

Also at step 410, the client device 402 may also generate signing cryptographic keys. For example, the client device 402 can generate another ECC P-256 key pair, KSIGNpub and KSIGNpriv, for signing intent. For example, the ECDSA with SHA256 cryptographic technique can be used for signing. Signing the intent can be for particularly sensitive actions such as sending money or other sensitive currency actions via the back-end server 406. The KDECpub and KSIGNpub keys can be registered when logging in or creating an account (e.g., digital wallet account) with the back-end server 406, such as sending KSIGNpub to the back-end server 406 for key enrollment. This architecture shown in the example flow diagram 400 may be beneficial, because reusing the same key for both signing and encrypting for cryptography can increase a risk of known exploitation attacks or other malicious activity. Two separate keys may provide better domain separation and key management. Key enrollment for signature keys also can occur in conjunction with other actions such as login, create account, password recover, password change, or any other request from the client device 402 in which password information is sent to the back-end server 406. Due to KSIGN keys being of relatively higher sensitivity, they may be stored in secure hardware or in memory only.

For sending a request to the back-end server 406 at step 412, the client device 402 can generate an ephemeral ECC X25519 key pair, KEPHpriv and KEPHpub. The ephemeral key pair can be for a one-time use for a particular request payload from the client device 402, which can improve the security of the example data flow. The client device 402 may encrypt the content of each field in a request payload with the corresponding service's public key (e.g., KAUTHpub, KMEDIApub, etc.) for field-by-field encryption, except for the payment facade service. The payment facade service fields can be grouped into one single JSON payload before encryption such as via KWCpub. As an example, for password encryption for the request payload, the service key to use may be KAUTH. For example, the client device 402 may perform ECDH with KAUTHpub and KEPHpriv to derive an AES GCM cryptographic key (e.g., final byte[ ] agreement=ECAgreement.calculate(KAUTHpub, KEPHpriv). Based on the derived key, the client device 402 can encrypt the content for the request payload. The client device may package the encrypted payload in a specific format containing KEPHpub and the encrypted cipher text.

That is, the encrypted payload can be attached to the request payload sent by the client device 402 to the back-end server 406. For specific intents in the request payload that should be signed such as specific actions including login, transaction, and/or encryption key registration, the client device 402 can be used by the corresponding user to sign the required specific intents with KSIGNpriv and ECDSA. The client device 402 may create the specific intents that need to be signed for the request payload in an expected JSON statement format, such as signing intents with KSIGNpriv. In particular, the client device 402 may pack the signed request payload and signature into an encrypted payload format such as a JWS payload. As an example, at step 412, the client device 402 can send the request payload as an XMPP request containing plain text fields and JWS intents (e.g., JWS tokens) to the middle server 404.

As an example, the client device 402 may send the XMPP request as a login request that is encrypted against the authentication service as signed intents. The password in this request can be encrypted against the authentication service while login-request-id, decryption-public-key, decryption-key-id and signing-public-key can remain in plain text. The middle server 404 and back-end server 406 can be configured to process and respond back to the XMPP request or other request payload from the client device 402. The middle server 404 may route the plain text fields, JWS intents (if present), and a required RPC doc ID to the payment facade service of the back-end server 406, such as via a communication protocol (e.g., Thrift). That is, the middle server 404 may send the request payload as an RPC request. The middle server 404 is capable of using the plain text fields for debugging or other appropriate purposes.

The payment facade service back-end server 406 may decode the JWS intents and verifies the signature using KSIGNpub. The payment facade service back-end server 406 may validate that the value of the plain text fields in JWS token match the plain text fields in the request and returns an error to the middle server 404 if they don't match. In this way, the middle server 404 and back-end server 406 can function in conjunction for message payload integrity protection. After verifying the signature, the payment facade service back-end server 406 can also perform ECDH with KWCpriv and KEPHpub to derive the AES symmetric key. The payment facade service back-end server 406 can decrypt the request payload encrypted against the payment facade service with the AES symmetric key. The payment facade service back-end server 406 can forward the fields of the request payload that are encrypted against other services like the authentication service, such as forwarding encrypted password information (e.g., password information of the corresponding user of the client device 402) to the respective service along with the JWS token.

Accordingly, the back-end server 406 can function as a gateway to various service endpoints, such as for the different services including the payment facade service, authentication service, and media service. As an example, the authentication service also can verify the signature of the request payload from the JWS token and perform ECDH with KAUTHpriv and KEPHpub to derive the AES symmetric key. Subsequently, the authentication service can decrypt the password using this AES key. After the XMPP request has been processed, the back-end server 406 can prepare a response payload. At step 414, the back-end server 406 can send the response payload to the middle server 404 as an RPC response including plain text fields and encrypted JSON. The middle server 404 can then use the RPC response to send an XMPP response including the plain text fields and the encrypted JSON to the client device 402. In particular, the back-end server 406 can generate an ephemeral ECC X25519 key pair, KEPHSERV including KEPHSERVpriv and KEPHSERVpub.

The back-end server 406 can perform ECDH with KEPHSERVpriv and KDECpub and to derive an AES GCM symmetric key. The back-end server 406 can pack the fields that need to be encrypted in a JSON and encrypts the JSON with the AES symmetric key. The back-end server 406 can pack this encrypted JSON with the plain text fields and send it back to the middle server 404 as the RPC response. In turn, the middle server 404 can relay the encrypted JSON to the client device 402 by transforming the RPC server response into the XMPP response. The client device 402 may process the server response. For example, the client device 402 may perform ECDH with KEPHSERVpub and KDECpriv and derives the AES symmetric key. In this way, the client device can decrypt the encrypted part of the XMPP response with the symmetric key.

The example data flow of the example flow diagram 400 can similarly be used for push notification encryption of push notifications from the middle server 404 and/or back-end server 406 to the client device 402. For example, the back-end server 406 may generate the ephemeral ECC X25519 key pair, KEPHSERV and perform ECDH with KEPHSERVpriv and KDECpub and derives the AES GCM symmetric key. The back-end server 406 may encrypt the response payload for the push notification with the AES symmetric key. The middle server 404 may send the push notification via KEPHSERVpub and the encrypted response payload to the client device 402 upon receiving a communication protocol call (e.g., Apache Thrift call) from the back-end server 406. The client device 402 may then perform ECDH with KEPHSERVpub and KDECpriv to derive the AES symmetric key. The client device 402 may decrypt the response payload message with the symmetric key. Thus, the shared secret between the client device 402 and back-end server 406 as described herein can include deriving the symmetric key for encryption and decryption of message JSON payloads, respectively.

In the example data flow and cryptographic communication described herein between client side and server side components, a reference-based JSON encryption technique can be applied for data separation requirements. For example, JSON values can be used to obscure field names and/or other confidential/sensitive information so that mediator components such as the "man in the middle" intermediate server 404 cannot access the confidential/sensitive information. That is, the JSON values can be substituted for original sensitive information from the client device 402 so that the middle server 404 merely verifies the integrity and formatting of messages/request from the client device 402 without accessing the sensitive information. This advantageously may fulfill data separation requirements while enabling mediator or intermediate components to centralize requests to the back-end server 406, such as requests for payment processing and/or digital wallet related services (e.g., the payment facade service, the authentication service, the media service) without compromising required encryptions.

The reference-based JSON encryption can include reference IDs rather than field names when creating the encrypted JSON payloads described herein. Creation of the JSON payloads can be based on randomly generated prefixes. For example, reference IDs may replace the use of field names when creating JSONs that need to be encrypted, for both client to server encryption and serve to client encryption. For example, sensitive fields can be encrypted while fields marked as "other" can remain in plain text. The middle server 404 and/or the back-end server 406 can be configured to perform server-side filtering and the client device can be configured to perform XMPP to JSON conversion, such as based on ECDH generation for the AES symmetric key. Additionally or alternatively, merging sub JSONs can be applied. The reference-based JSON encryption may involve reference ID and/or reference prefix generation for client request payloads from the client device 402 such as based on a server-side component for the back-end server 406 to be able to decrypt with the shared cryptographic secret.

As an example, reference-based JSON encryption can be applied to a save address action performed for a digital wallet account for the client device 402 via the back-end server 406. The save address action can include data that needs to be encrypted relative to the middle server 404 but does not need to be encrypted for the back-end server for data separation requirements. For the save address action, a reference JSON for the fields that need to be encrypted for the data may be encrypted relative to the middle server 404. Such fields being encrypted may contain personally identifiable information for the user seeking to perform save address action. Accordingly, JSON ID values can replace the values in the original request from the client device 402 with the reference fields and then the reference JSON can be encrypted using a payment facade service public key.

That is, for encrypting the JSON request payload, the attributes in the XML request from the client device 402 can be replaced with the reference IDs and have the encrypted JSON attached as another attribute. In this way, the middle server 404 may route the request payload from the client device 402 to the back-end server 406 with integrity protection while advantageously not having access to sensitive/confidential information to comply with data separation requirements. After being routed to the back-end server 406, the back-end server 406 can extract the XML attributes and send them to the payment facade service via Apache Thrift. Since the back-end server 406 may function as a gateway for the different services, the payment facade service may have access to the shared cryptographic secret/keys shared with the client device 402. The payment facade service can decrypt the encrypted reference JSON and replace reference values in the original request from the client device with the actual decrypted values, such as based on a reference ID to value mapping. After the payment facade service determines the original values via the mapping, the payment facade service can call a save address RPC API to execute the original request from the client device 402.

For other types of requests, such as a digital wallet transaction conducted via the client device 402 and back-end server 406, the back-end server 406 may need to send a transaction back to the user of the client device 402 as a response. For this transaction, the amount of the transaction should be encrypted while the ID and currency can be sent in plain text, for example. Thus, for the back-end server 406 to send the transaction back in a transaction response payload, the response payload needs to be partially encrypted. The payment facade service connected to the back-end server gateway 406 can replace the transaction amount values with reference IDs and encrypt the JSON of the reference IDs. For encryption, the payment facade service can generate the ephemeral key pair. This response payload can be sent to the middle server 404 by the back-end server 406 for conversion to an XMPP format before the middle server 404 forwards the response payload to the client device 402. When the client device 402 receives the response payload, the client device 402 needs to first decrypt the encrypted-wc-blob by generating an AES key by doing an ECDH between KEPHSERVpub and KDECpriv. The client device 402 may replace the ref_id fields in the XMPP stanza with the values from encrypted-wc-blob to obtain the decrypted final response.

Figure 5:
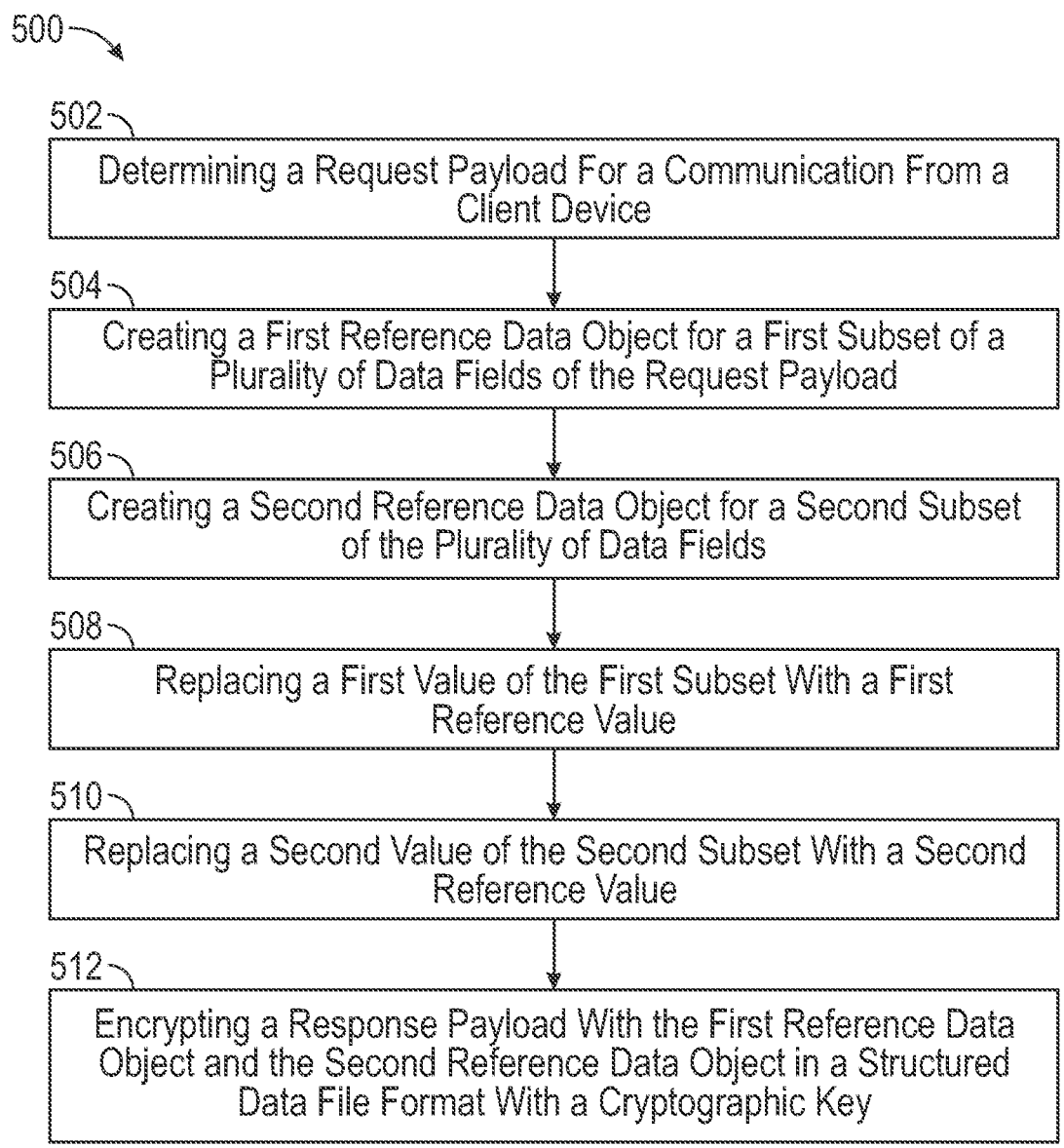
FIG. 5 is an example flow diagram for an example of end-to-end encryption between a client and a server back-end, according to certain aspects of the present disclosure.

FIG. 5 illustrates an example flow diagram (e.g., process 500) for providing encryption of data with data separation, according to certain aspects of the disclosure. For explanatory purposes, the example process 500 is described herein with reference to one or more of the figures above. Further for explanatory purposes, the blocks of the example process 500 are described herein as occurring in serial, or linearly. However, multiple instances of the example process 500 may occur in parallel, overlapping in time, almost simultaneously, or in a different order from the order illustrated in the process 500. In addition, the blocks of the example process 500 need not be performed in the order shown and/or one or more of the blocks of the example process 500 need not be performed.

At step 502, a request payload for a communication from a client device may be determined. According to an aspect, determining the request payload comprises determining the plurality of data fields and encrypted content of the communication. According to an aspect, determining the request payload comprises constructing the request payload based on a signed intended action and field by field encryption. According to an aspect, determining the request payload comprises generating a plurality of cryptographic key pairs by the client device, wherein the plurality of cryptographic keys comprises at least one of: an Elliptic Curve Diffie-Hellman key pair, an ephemeral key pair, or a symmetric cipher key pair. At step 504, a first reference data object for a first subset of a plurality of data fields of the request payload that correspond to a first service may be created. According to an aspect, creating the first reference data object comprises creating a first reference JSON object comprising encrypted data fields and an encryption attribute for password encryption of the first subset according to the first service.

At step 506, a second reference data object for a second subset of the plurality of data fields that correspond to a second service may be created. According to an aspect, creating the second reference data object comprises creating a second reference JSON object comprising encrypted data fields and an encryption attribute for identification encryption of the second subset according to the first service. At step 508, a first value of the first subset may be replaced with a first reference value. According to an aspect, replacing the first value with the first reference value comprises generating a first random prefix and first hash function based on the request payload. At step 510, a second value of the second subset may be replaced with a second reference value. According to an aspect, replacing the second value with the second reference value comprises generating a second random prefix and second hash function based on the request payload. At step 512, a response payload may be encrypted with the first reference data object and the second reference data object in an encrypted text-based structured data file format with a cryptographic key. According to an aspect, encrypting the response payload comprises generating an ephemeral key pair shared with the client device, determining a plurality of text fields of the plurality of data fields and an encrypted data file format attribute, and determining that a plurality of data fields of the request payload correspond to a corresponding value of an encryption token.

According to an aspect, the process 500 may further include uploading a media content item, encrypting the media content item by the client device, and receiving a media model handle by the client device. According to an aspect, the process 500 may further include receiving a plurality of digital certificates, validating certificate paths for the plurality of digital certificates based on a stored root canal certificate string, and generating a plurality of cryptographic key pairs based on the plurality of digital certificates. According to an aspect, the process 500 may further include decrypting the response payload by replacing the first reference value and the second reference value with corresponding decrypted values based on reference value mapping. According to an aspect, the process 500 may further include obtaining a first cryptographic key for the first service and a second cryptographic key for the second service for endpoint encryption according to the first service and the second service. According to an aspect, the process 500 may further include verifying a signed intent based on a serialization according to the first service or the second service via a signature key.

Figure 6:
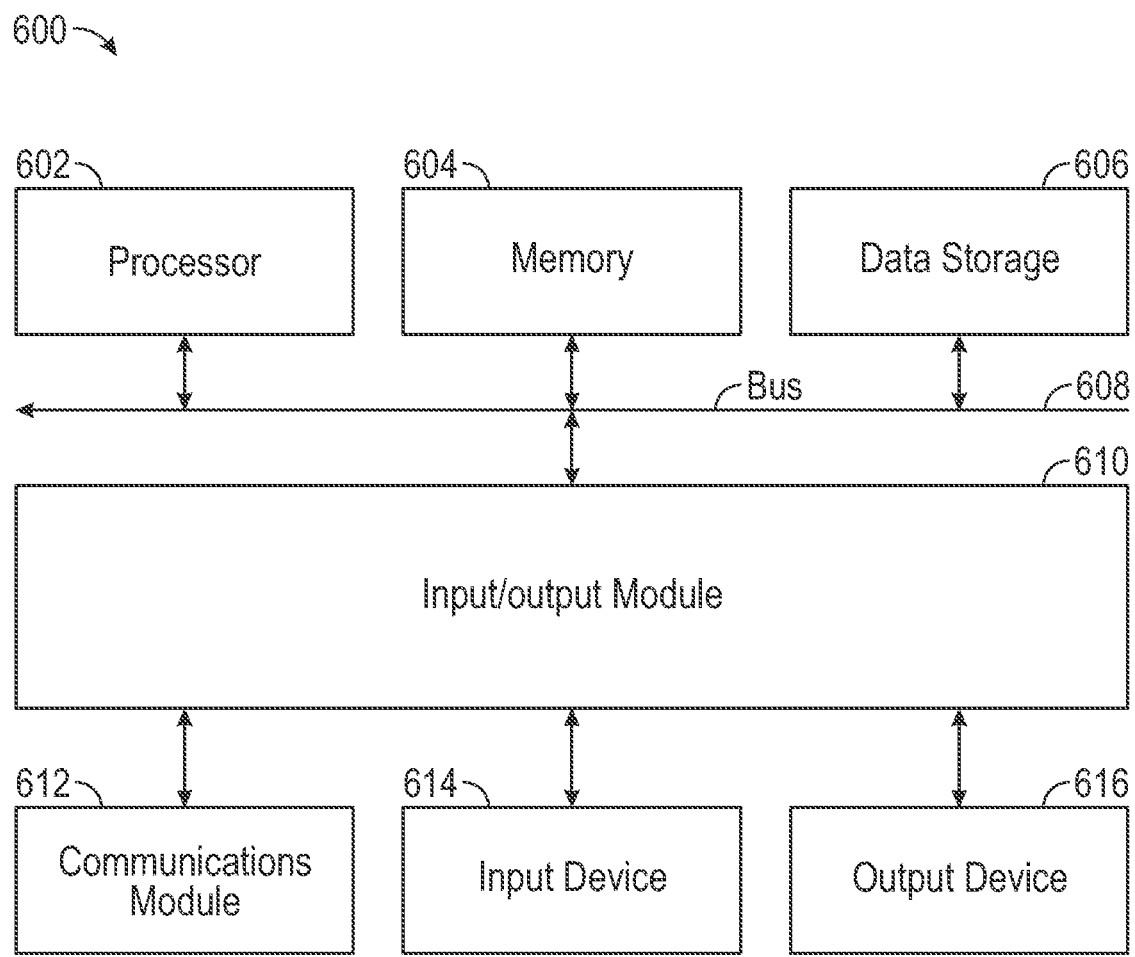
FIG. 6 is a block diagram illustrating an example computer system in which aspects of the present disclosure can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

The computer system 600 (e.g., server and/or client) includes a bus 608 or other communication mechanism for communicating information, and a processor 602 coupled with the bus 608 for processing information. By way of example, the computer system 600 may be implemented with one or more processors 602. Each of the one or more processors 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by the processor 602.

A computer program, as discussed herein, does not necessarily correspond to a file in a file system. A program can be stored in a portion of a file that holds other programs or data (e.g., one or more scripts stored in a markup language document) in a single file dedicated to the program in question or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors, executing one or more computer programs to perform functions by operating on input data and generating output.

The computer system 600 further includes a data storage device 606, such as a magnetic disk or optical disk, coupled to bus 608 for storing information and instructions. The computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described systems can be implemented using a computer system 600 in response to the processor 602 executing one or more sequences of one or more instructions contained in the memory 604. Such instructions may be read into memory 604 from another machine-readable medium, such as data storage device 606. Execution of the sequences of instructions contained in the main memory 604 causes the processor 602 to perform the process steps described herein. One or more processors in a multi-processing arrangement may also be employed to execute the sequences of instructions contained in the memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 600 can include clients and servers. A client and server are generally remote from each other and typically interact through a communication network. The relationship of client and server arises by virtue of computer programs running on the respective computers and having a client-server relationship to each other. The computer system 600 can be, for example, and without limitation, a desktop computer, laptop computer, or tablet computer. The computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 602 for execution. Such a medium may take many forms, including, but not limited to, non-volatile media, volatile media, and transmission media. Non-volatile media include, for example, optical or magnetic disks, such as the data storage device 606. Volatile media include dynamic memory, such as the memory 604. Transmission media include coaxial cables, copper wire, and fiber optics, including the wires that comprise the bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification, in the context of separate embodiments, can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for providing encryption of data with data separation, the method comprising:
   determining a request payload for a communication from a client device;
   creating a first reference data object for a first subset of a plurality of data fields of the request payload that correspond to a first service;
   creating a second reference data object for a second subset of the plurality of data fields corresponding to a second service;
   replacing a first value of the first subset with a first reference value;
   obtaining a first cryptographic key for the first service and a second cryptographic key for the second service for endpoint encryption according to the first service and the second service;
   replacing a second value of the second subset with a second reference value;
   encrypting a response payload with the first reference data object and the second reference data object in an encrypted text-based structured data file format with a cryptographic key;
   verifying a signed intent based on a serialization according to the first service or the second service via a signature key; and
   permitting, based on verifying the signed intent, execution of an action requested by the client device.

2. The computer-implemented method of claim 1, wherein determining the request payload comprises:
   determining the plurality of data fields and encrypted content of the communication; and
   constructing the request payload based on a signed intended action and field by field encryption.

3. The computer-implemented method of claim 1, wherein determining the request payload comprises generating a plurality of cryptographic key pairs by the client device, wherein the plurality of cryptographic keys comprises at least one of: an Elliptic Curve Diffie-Hellman key pair, an ephemeral key pair, or a symmetric cipher key pair.

4. The computer-implemented method of claim 1, wherein creating the first reference data object comprises creating a first reference JavaScript Object Notation (JSON) object comprising encrypted data fields and an encryption attribute for password encryption of the first subset according to the first service.

5. The computer-implemented method of claim 1, wherein creating the second reference data object comprises creating a second reference JavaScript Object Notation (JSON) object comprising encrypted data fields and an encryption attribute for identification encryption of the second subset according to the first service.

6. The computer-implemented method of claim 1, wherein replacing the first value with the first reference value comprises generating a first random prefix and first hash function based on the request payload and replacing the second value with the second reference value comprises generating a second random prefix and second hash function based on the request payload.

7. The computer-implemented method of claim 1, wherein encrypting the response payload comprises:
   generating an ephemeral key pair shared with the client device;
   determining a plurality of text fields of the plurality of data fields and an encrypted data file format attribute; and
   determining that a plurality of data fields of the request payload correspond to a corresponding value of an encryption token.

8. The computer-implemented method of claim 1, further comprising:
   uploading a media content item;
   encrypting the media content item by the client device; and
   receiving a media model handle by the client device.

9. The computer-implemented method of claim 1, further comprising:
   receiving a plurality of digital certificates;
   validating certificate paths for the plurality of digital certificates based on a stored root canal certificate string; and
   generating a plurality of cryptographic key pairs based on the plurality of digital certificates.

10. The computer-implemented method of claim 1, further comprising:
    decrypting the response payload by replacing the first reference value and the second reference value with corresponding decrypted values based on reference value mapping.

11. A system for providing encryption of data with data separation, comprising:
    one or more processors; and
    a memory comprising instructions stored thereon, which when executed by the one or more processors, causes the one or more processors to perform:
    determining a request payload for a communication from a client device;
    creating a first reference data object for a first subset of a plurality of data fields of the request payload that correspond to a first service;
    creating a second reference data object for a second subset of the plurality of data fields that correspond to a second service;

obtaining a first cryptographic key for the first service and a second cryptographic key for the second service for endpoint encryption according to the first service and the second service;

replacing a first value of the first subset with a first reference value;

replacing a second value of the second subset with a second reference value;

encrypting a response payload with the first reference data object and the second reference data object in an encrypted text-based structured data file format with a cryptographic key;

verifying a signed intent based on a serialization according to the first service or the second service via a signature key; and permitting, based on verifying the signed intent, execution of an action requested by the client device.

12. The system of claim 11, wherein the instructions that cause the one or more processors to perform determining a request payload for a communication from a client device cause the one or more processors to perform:

determining the plurality of data fields and encrypted content of the communication;

constructing the request payload based on a signed intended action and field-by-field encryption; and generating a plurality of cryptographic key pairs by the client device, wherein the plurality of cryptographic keys comprises at least one of: an Elliptic Curve Diffie-Hellman key pair, an ephemeral key pair, or a symmetric cipher key.

13. The system of claim 11, wherein the instructions that cause the one or more processors to perform creating the first reference data object cause the one or more processors to perform creating a first reference JavaScript Object Notation (JSON) object comprising encrypted data fields and an encryption attribute for password encryption of the first subset according to the first service.

14. The system of claim 11, wherein the instructions that cause the one or more processors to perform creating the second reference data object cause the one or more processors to perform creating a second reference JavaScript Object Notation (JSON) object comprising encrypted data fields and an encryption attribute for identification encryption of the second subset according to the first service.

15. The system of claim 11, wherein the instructions that cause the one or more processors to perform replacing the first reference value with a first encrypted value and replacing the second reference value with a second encrypted value cause the one or more processors to perform generating a first random prefix and first hash function based on the request payload and generating a second random prefix and second hash function based on the request payload.

16. The system of claim 11, wherein the instructions that cause the one or more processors to perform encrypting the response payload cause the one or more processors to perform:

generating an ephemeral key pair shared with the client device;

determining a plurality of text fields of the plurality of data fields and an encrypted data file format attribute; and determining that a plurality of data fields of the request payload correspond to a corresponding value of an encryption token.

17. The system of claim 11, further comprising stored sequences of instructions, which when executed by the one or more processors, cause the one or more processors to perform:

uploading a media content item;

encrypting the media content item by the client device; and receiving a media model handle by the client device.

18. The system of claim 11, further comprising stored sequences of instructions, which when executed by the one or more processors, cause the one or more processors to perform:

receiving a plurality of digital certificates;

validating certificate paths for the plurality of digital certificates based on a stored root canal certificate string; and generating a plurality of cryptographic key pairs based on the plurality of digital certificates.

19. The system of claim 11, further comprising stored sequences of instructions, which when executed by the one or more processors, cause the one or more processors to perform:

decrypting the response payload by replacing the first reference value and the second reference value with corresponding decrypted values based on reference value mapping.

20. A non-transitory computer-readable storage medium comprising instructions stored thereon, which when executed by one or more processors, cause the one or more processors to perform operations for providing encryption of data with data separation, comprising:

determining a request payload for a communication from a client device;

creating a first reference data object for a first subset of a plurality of data fields of the request payload that correspond to a first service;

creating a second reference data object for a second subset of the plurality of data fields that correspond to a second service;

obtaining a first cryptographic key for the first service and a second cryptographic key for the second service for endpoint encryption according to the first service and the second service;

replacing a first value of the first subset with a first reference value;

replacing a second value of the second subset with a second reference value;

encrypting a response payload with the first reference data object and the second reference data object in an encrypted text-based structured data file format with a cryptographic key;

verifying a signed intent based on a serialization according to the first service or the second service via a signature key; and permitting, based on verifying the signed intent, execution of an action requested by the client device.

* * * * *